(12) United States Patent
Mueh et al.

(10) Patent No.: US 9,481,580 B2
(45) Date of Patent: Nov. 1, 2016

(54) SELECTIVE SPLITTING OF HIGH ORDER SILANES

(75) Inventors: Ekkehard Mueh, Rheinfelden (DE); Hartwig Rauleder, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/884,473

(22) PCT Filed: Oct. 24, 2011

(86) PCT No.: PCT/EP2011/068534
§ 371 (c)(1),
(2), (4) Date: Jul. 23, 2013

(87) PCT Pub. No.: WO2012/062560
PCT Pub. Date: May 18, 2012

(65) Prior Publication Data
US 2013/0294995 A1    Nov. 7, 2013

(30) Foreign Application Priority Data
Nov. 9, 2010  (DE) ................ 10 2010 043 648

(51) Int. Cl.
| | | |
|---|---|---|
| C01B 33/107 | (2006.01) | |
| C01B 33/04 | (2006.01) | |
| C01B 33/08 | (2006.01) | |
| B01J 37/06 | (2006.01) | |
| B01J 21/08 | (2006.01) | |
| B01J 37/02 | (2006.01) | |

(52) U.S. Cl.
CPC ....... *C01B 33/10742* (2013.01); *C01B 33/043* (2013.01); *C01B 33/08* (2013.01); *C01B 33/1071* (2013.01); *C01B 33/10773* (2013.01); *B01J 21/08* (2013.01); *B01J 37/0215* (2013.01); *B01J 37/06* (2013.01); *C01B 33/107* (2013.01)

(58) Field of Classification Search
CPC .......... C01B 33/107; C01B 33/1071
USPC ........................................ 423/342
See application file for complete search history.

(56) References Cited

U.S. PATENT DOCUMENTS

| | | | |
|---|---|---|---|
| 2,709,176 A | 5/1955 | Bluestein | |
| 5,292,912 A | 3/1994 | Chadwick et al. | |
| 5,416,232 A | 5/1995 | Brendler et al. | |
| 5,502,230 A | 3/1996 | Mautner et al. | |
| 8,038,961 B2 | 10/2011 | Sonnenschein et al. | |
| 8,105,564 B2 | 1/2012 | Sonnenschein et al. | |
| 2005/0113592 A1 | 5/2005 | Wagner et al. | |
| 2010/0080746 A1 | 4/2010 | Lang et al. | |
| 2010/0296994 A1 | 11/2010 | Rauleder et al. | |
| 2012/0177557 A1 | 7/2012 | Rauleder et al. | |
| 2012/0183464 A1 | 7/2012 | Mueh et al. | |
| 2012/0214005 A1 | 8/2012 | Wieber et al. | |

FOREIGN PATENT DOCUMENTS

| | | |
|---|---|---|
| EP | 0 610 809 | 8/1994 |
| EP | 0 635 510 | 1/1995 |
| EP | 0 700 920 | 3/1996 |
| EP | 1 505 070 | 2/2005 |
| WO | 2012 062526 | 5/2012 |
| WO | 2012 062562 | 5/2012 |

OTHER PUBLICATIONS

U.S. Appl. No. 14/111,643, filed Oct. 14, 2013, Mueh, et al.
U.S. Appl. No. 13/985,477, filed Aug. 14, 2013, Mueh, et al.
International Search Report Issued May 7, 2012 in PCT/EP11/68534 Filed Oct. 24, 2011.
U.S. Appl. No. 13/884,326, filed May 9, 2013, Mueh, et al.

*Primary Examiner* — Matthew E Hoban
*Assistant Examiner* — James Fiorito
(74) *Attorney, Agent, or Firm* — Oblon, McClelland, Maier & Neustadt, L.L.P.

(57) ABSTRACT

The invention relates to a process for preparing monomeric and/or dimeric halogen- and/or hydrogen-containing silicon compounds from oligomeric inorganic silanes having three or more directly covalently interconnected silicon atoms substituted by substituents selected from halogen, hydrogen and/or oxygen by reacting the oligomeric silane over a nitrogen-containing catalyst in the presence of hydrogen halide.

22 Claims, 1 Drawing Sheet

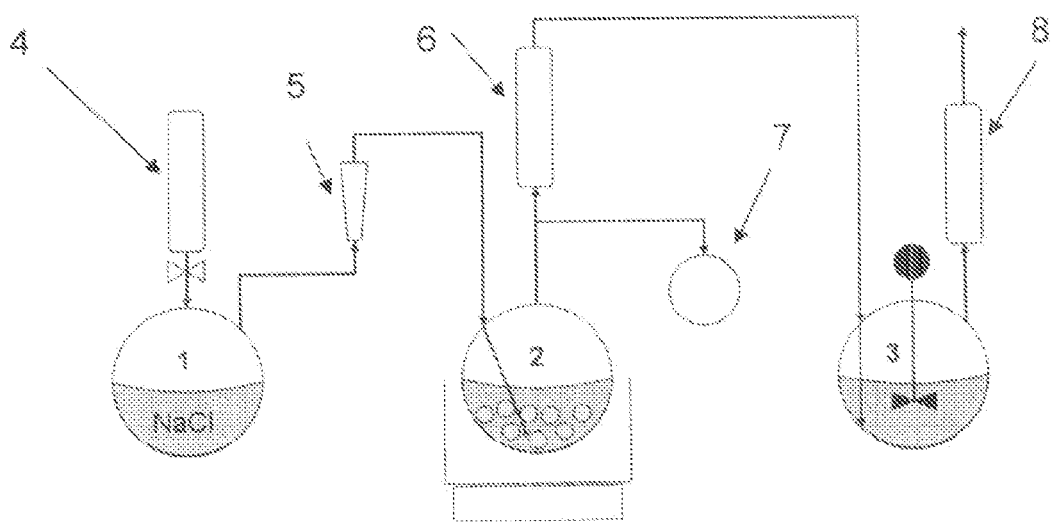

SELECTIVE SPLITTING OF HIGH ORDER SILANES

The invention relates to a process for preparing monomeric and/or dimeric halogen- and/or hydrogen-containing silicon compounds from oligomeric inorganic silanes having three or more directly covalently interconnected silicon atoms substituted by substituents selected from halogen, hydrogen and optionally oxygen by reacting the oligomeric inorganic silane over a nitrogen-containing catalyst in the presence of hydrogen halide.

The semiconductor and solar industries use high-purity polycrystalline silicon compounds. The production of polycrystalline silicon involves various component operations that generate high-volume oligomeric silanes including, for example, oligochlorosilanes having 3- or 4 silicon atoms in the molecule. Although these oligochlorosilanes are of high purity by virtue of their method of making, they have hitherto been technologically unimportant.

WO 2006/125425 A1 discloses a two-stage process for production of bulk silicon from halosilanes. The first stage comprises exposing preferably halosilanes, such as fluoro- or chlorosilanes to a plasma discharge in the presence of hydrogen. The polysilane mixture obtained from the first stage is pyrolyzed in the subsequent second stage to silicon at temperatures of 400° C. or higher and preferably of 700° C. or higher. It is known to convert oligomeric chlorosilanes to pyrogenous silica in the presence of tetrachlorosilane (DE 10 2006 009953 A1).

Hexachlorodisilane is of great interest for use as low-temperature precursor to produce silicon nitride (SiN) layers for example.

The present invention has for its object to render oligochlorosilanes technologically useful and are used then to prepare interesting silanes, specifically low molecular weight silanes. The present invention further has for its object to provide an economically viable process whereby oligomeric silicon compounds can be converted into monomeric and/or dimeric silanes. The invention likewise has for its object to split the pure oligochlorosilanes by-produced in the course of the production of polycrystalline silicon or other processes involving reaction of halosilanes, into monomeric or dimeric silanes. The process according to the present invention shall even be able to use comparatively high molecular weight oligohalosilanes obtained via the various plasma discharge processes and, as the case may be, generated as by-product.

These objects are achieved according to the independent claims, while preferred embodiments are disclosed in the dependent claims and also detailed in the description.

Surprisingly, oligohalosilanes are found to be splittable into low molecular weight halosilanes, specifically down to dimeric and/or monomeric compounds, under particular processing conditions. It is also surprising that the process can be used not only for oligomeric halosilanes, oligomeric halohydrogensilanes but also for oligomeric hydrogen silanes, specifically conforming to the general formulae II, III and/or IV, and generally provides low molecular weight halohydrogensilanes or halosilanes of the general formula I. To split the oligosilanes mentioned it is surprisingly sufficient to contact them with hydrogen halide, preferably hydrogen chloride, in the presence of a nitrogen-containing catalyst. The splitting reaction can take place at a temperature as low as room temperature, although it is preferably carried out at a temperature of 20 to 200° C., more preferably at 50 to 150° C., and specifically at 80 to 120° C., and at a pressure of 10 mbar to 10 bar, more preferably 100 mbar to 2 bar and specifically 0.8 to 1.2 bar. The invention accordingly also provides a process in which the monomeric and optionally dimeric silicon compounds of formula I can be separated from the oligomeric silanes without separate input of energy, specifically without supplying thermal energy, preferably by distillation. Technically, it is particularly preferable for the ease of removal of the reaction product from the catalyst for the catalyst to have a distinctly higher boiling temperature than the starting materials or the boiling reaction mixture, for example above 70° C., better above 90° C., and specifically >110° C., is solid or the reaction is catalyzed heterogeneously, i.e. the nitrogen-containing catalyst is chemically immobilized on a support.

The invention accordingly provides a process for preparing monomeric and/or dimeric silicon compounds of the general formula I from an oligomeric inorganic silane or a mixture comprising oligomeric inorganic silanes having three or more silicon atoms where the substituents on the silicon atoms are selected from halogen and hydrogen, by reacting the oligomeric silane or the mixture in the presence of hydrogen halide over a nitrogen-containing catalyst to form silicon compounds of the general formula I. It may be the case that an oligomeric silane may also have a substituent bonded via an oxygen atom if, for example, the oligomeric silane has come into contact with moisture.

The invention thus likewise provides a process for preparing monomeric and/or dimeric silicon compounds of the general formula I where X in each occurrence is independently halogen, and specifically the halogen is in each occurrence independently selected from chlorine, bromine, iodine and fluorine, preferably X is chlorine, H is hydrogen, n is 1 or 2 and x is an integer between 0 to 6, i.e. 0, 1, 2, 3, 4, 5 or 6, x is preferably 0 or 1 for n=1 and n=2 respectively, y is a number between 0 and 6, preferably 3 or 4 for n=1 or, respectively, 5 or 6 for n=2, with the proviso that (y+x) is =(2n+2), $$Si_nH_xX_y \quad (I)$$

from an oligomeric inorganic silane or a mixture comprising oligomeric inorganic silanes, wherein an oligomeric silane has three or more directly covalently connected silicon atoms, specifically having at least one .Si—Si—Si. fragment, and the further substituents on the silicon atoms are selected from halogen, hydrogen and/or oxygen, and the mixture possibly also comprises hydrolysates of oligomeric silanes, so that a silane or the mixture may also comprise silanes having additional Si—OH and/or Si—O—Si fragments, wherein the oligomeric silane or the mixture is reacted in the presence of hydrogen halide over a nitrogen-containing catalyst to form silicon compounds of the general formula I.

By way of example, a splitting reaction of octachlorotrisilane in the presence of HCl and a nitrogen-containing catalyst can be represented in idealized form via the following reaction equations:

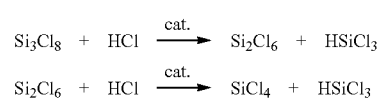

A splitting reaction of decachlorotetrasilane can be represented according to the following reaction equations:

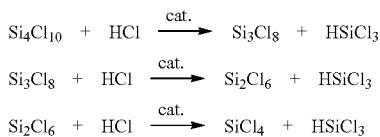

An oligomeric inorganic silane is preferably a silane having three or more covalently interlinked silicon atoms up to polymeric inorganic silanes whose free valences are essentially hydrogen and/or halogen saturated. Polymeric inorganic silanes are viscid or solid and have more than four, preferably on average 5 to 50 and specifically 9 to 25 or else 8 to 20 silicon atoms. Such a silane, or a mixture of such silanes, may possibly also comprise hydrolysis and possibly condensation products of silanes, so that the notion of oligomeric inorganic silane, or mixtures thereof, also comprehends silanes having siloxane bonds and/or silanol groups. It is a particular advantage of the invention that the oligomeric inorganic silane for the process according to the invention does not have to meet any special requirements regarding its solubility in a solvent. Preferably, the oligomeric silane should be soluble or dispersible in the starter materials or in liquid oligomeric silanes. This form of process management will split the high-purity oligomeric silane, which generally comes from operations involving high-purity reactants and products, into high-purity silicon compounds of Formula 1 in an economically viable manner. There is no need for involved purification. The person skilled in the art will appreciate that, to split viscid or solid oligomeric silanes, it may be necessary to heat the silanes in order to start the splitting reaction and also/or else to achieve complete distillative removal of the silicon compounds obtained. In principle, the process can be carried out as a continuous operation or as a batch operation.

The process according to the invention preferably utilizes, by way of oligomeric silane or by way of mixture comprising oligomeric silanes, perhalosilanes, hydrohalosilanes or hydrogen silanes, high order homologous halopolysilanes and also mixed hydrogenated halogenated polysilanes with or without their hydrolysis products and/or mixtures thereof. It is particularly preferable for the process to proceed from oligomeric silanes that are essentially perhalosilanes in order that they may be split into hydrohalosilanes and halosilanes. Oligomeric inorganic silanes or the mixture of oligomeric silanes preferably further comprise the following oligomeric silanes: trisilicon compound, tetrasilicon compound, pentasilicon compound, hexasilicon compound, heptasilicon compound, octasilicon compound, nonasilicon compound and/or decasilicon compound and/or up to high order polysilicon compound, which can each be independently present as perhalosilane, halohydrogensilane compound or hydrogen silane. The silanes can further be present as catenasilanes, cyclosilanes, and/or in branched or else crosslinked form. In addition, they can be present as polysilicon dihalides, polysilicon monohalogens as well as with a certain proportion of hydrogen.

It is particularly preferable for the process of the present invention to use octachlorotrisilane, decachlorotetrasilane, dodecachloropentasilane, tetradecahexasilane, decachlorocyclopentasilane or a mixture containing these is used as oligomeric inorganic silane.

It is particularly preferable for the oligomeric inorganic silanes to be selected from
  linear or branched silanes of the general formula II $$Si_mH_aX_b \qquad (II)$$

where m, a and b are each independently integers, with m not less than 3, specifically m=3 to 100, preferably m=3 to 50, more preferably m=3, 4, 5, 6, 7, 8, 9, 10, alternatively m is preferably =3 to 25, more preferably m=3 to 20, a 0 or not less than 1 and b 0 or not less than 1 with the proviso that a+b is =2 m+2, in preferred embodiments a is =0 or hydrogen is present in the silane at not more than 4% by weight to not more than 2% by weight, and/or
  cyclic, crosslinked and/or polymeric silanes of the general formula III $$Si_oH_pX_q \qquad \text{(III), preferably as } [SiX_2]_o$$

where o, p and q are each independently integers, with o not less than 3, specifically o=3 to 100, preferably o=5 to 50, more preferably o=3, 4, 5, 6, 7, 8, 9, 10, alternatively o is preferably =3 to 25, more preferably o=3 to 20; p 0 or not less than 1 and q 0 or not less than 1 provided p+q is =2o, in preferred embodiments p is =0 or hydrogen is present in the silane at not more than 4% by weight to not more than 2% by weight, and/or
  polymeric silanes of the general formula IV $$Si_rH_sX_t \qquad \text{(IV), preferably as } [SiX]_r,$$

where r, s and t are each independently integers with r not less than 3, specifically r=3 to 100, preferably r=6 to 50, more preferably r=6, 7, 8, 9, 10, 11, 12, 13, 14, 15, alternatively r is preferably =6 to 25, more preferably r=6 to 20; s 0 or not less than 1 and t 0 or not less than 1 provided s+t is =r, in preferred embodiments s is =0 or hydrogen is present in the silane at not more than 4% by weight to not more than 2% by weight, and
  with X in each occurrence independently in formulae II, III and/or IV is halogen, such as chlorine, bromine, fluorine, iodine; specifically chlorine and/or bromine, preferably chlorine, and the oligomeric silanes may possibly also comprise hydrolysates of the silanes of formulae III, IV and/or IV. According to the invention, X is chlorine.

The process according to the invention provides silicon compounds of the general formula I where n=1 or 2 and more preferably where X is chlorine, $$Si_nH_xX_y \qquad (I),$$

while in the case of n=1 it is particularly preferable for x to be =0 for tetrachlorosilane, =1 for trichlorosilane, =2 for dichlorosilane, and =3 for monochlorosilane. For n=2 it is preferable for x to be =0 and y to be =6 for hexachlorodisilane and also for x to be =1 and y to be =5 for pentachlorodisilane. In addition to these preferred, predominantly monomeric compounds, however, it is also possible to obtain further dimeric silanes or mixtures of monomeric and dimeric compounds comprising hexachlorodisilane, pentachlorohydrogendisilane or tetrachlorodihydrogendisilane. Moreover, brominated monomeric and/or dimeric silanes or else correspondingly iodated or fluorinated and also mixed halogenated silanes are obtainable. Examples are hexabromodisilane, hexaiododisilane, hexafluorodisilane, tetrabromosilane, tribromosilane, dibromosilane, tetraiodosilane, triiodosilane, diiodosilane, tetrafluorosilane, trifluorosilane and/or difluorosilane, which are obtainable from the correspondingly brominated, iodated or fluorinated oligomeric silanes by splitting.

In general, the silicon compound of the general formula I may comprise a perhalosilane, a halohydrogensilane compound, a hydrogensilane and also mixed halogenated silanes. Examples include hexahydrogendisilane, monosilane or mixtures containing these. Similarly, the silicon compound may comprise hexabromodisilane, pentabromohydrogendisilane, tetrabromodihydrogendisilane or a mixture containing these.

According to the invention, hexachlorodisilane or a mixture of hexachlorodisilane with tetrachlorosilane and/or trichlorosilane with or without dichlorosilane are obtained as silicon compounds of the general formula I. Possibly likewise produced monochlorosilane and/or monosilane must be condensed under special conditions with dichlorosilane, if present. In general, they are carried by the escaping hydrogen halide, such as HCl, out of the reaction mixture or an uncooled or weakly cooled (preferably at 0 to −20° C.) product receiver owing to their boiling points.

The hydrogen halide used in the process may generally comprise HCl, HBr, HF, HI or a mixture comprising two or more thereof. It is particularly preferable to use the hydrogen halide in the process in accordance with the substitution of the oligomeric halosilanes. When oligomeric chlorosilanes are to be split it is preferable to use HCl. The hydrogen halides can be passed into the oligomeric silanes. For this, it can be synthesized and also vaporized in situ and passed in, or it can be directly taken from a gas bottle. It is particularly preferable for the hydrogen halide to be of high purity and not to contribute to contaminating the splitting reaction products.

In accordance with a further feature of the process according to the invention, the compound of formula I or the compounds of formula I are advantageously removed distillatively, specifically from the oligomeric silanes, during the splitting reaction. Distillative removal of low molecular weight species disturbs the reaction equilibrium permanently and is advantageous in promoting the formation of these compounds. It is particularly preferable to condense the compound of formula I and it is further preferable for the different compounds of formula I to be subjected to a fractional condensation.

It is further preferable for the nitrogen-containing catalyst used in the process according to the invention to be an organic-functionalized, amino-functionalized catalyst, specifically an aminoalkyl-functionalized catalyst, which preferably is also polymeric and chemically fixed to a support material. Alternatively, solid insoluble and/or high-boiling nitrogen-containing compounds can also be used as catalyst. The support material may generally be any material with reactive groups to which the amino-functionalized catalysts can be attached. Preferably, the support material is in the form of a shaped body, such as ball, rod or particle shaped.

Particularly preferred nitrogen-containing catalysts are the nitrogen-containing catalysts which follow and/or are derived therefrom by hydrolysis and/or condensation, such as more preferably an amino-functionalized compound having alkyl-functionalized secondary, tertiary and/or quaternary amino groups, specifically an aminoalkoxysilane of the general formula V, or more preferably at least one hydrolysis and/or condensation product thereof.

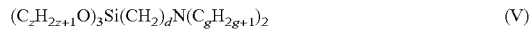

(V)

where $z=1$ to 4, $g=1$ to 10, $d=1$ to 3, or a monomeric or oligomeric aminosilane derived therefrom and chemically bonded to a support material; in formula V it is particularly preferable for z to be =1 to 4, specifically independently 1 or 2, and independently $d=3$ or 2 and $g=1$ to 18, or a hydrocarbon-substituted amine of formula VI or VII $$NH_kR_{3-k}$$ (VI)

with $k=0$, 1 or 2 where R corresponds to an aliphatic linear or branched or cycloaliphatic or aromatic hydrocarbon having 1 to 20 carbon atoms, wherein the R moieties are identical to or different from each other, R preferably has at least two carbon atoms, or $$[NH_lR^1{}_{4-l}]^+Z^-$$ (VII)

with $l=0$, 1, 2 or 3, where $R^1$ corresponds to an aliphatic linear or branched or cycloaliphatic or aromatic hydrocarbon having 1 to 18 carbon atoms, wherein the $R^1$ moieties are identical to or different from each other and Z is an anion, preferably a halide, preferably $R^1$ has at least two carbon atoms, or a divinylbenzene-crosslinked polystyrene resin having tertiary amine groups.

It is particularly preferable for the catalyst to be an aminoalkoxysilane of the general formula V or a catalyst obtained by hydrolysis and/or condensation which is chemically fixed to a support and preferably is covalently bonded to the support, specifically to a silicate support. According to the invention, the catalyst is diisobutylaminopropyltrimethoxysilane or a hydrolysis and/or condensation product thereof, and is used on a silicate support material. Furthermore, catalysts used in the process according to the invention are all anhydrous or essentially anhydrous. Therefore, before they are used in the process, the catalysts are carefully dried without decomposing or deactivating them.

A catalyst of formula V according to the invention or its hydrolysis and/or condensation products preferably have the following indices: z in each occurrence is independently 1, 2, 3 or 4, with g in each occurrence independently 1, 2, 3, 4, 5, 6, 7, 8, 9 or 10 and d in each occurrence independently 1, 2 or 3 or monomeric or oligomeric aminosilanes derived therefrom and chemically bonded on the support material. The group $-(C_gH_{2g+1})$ of formula V can in each occurrence independently be an n-alkyl, isoalkyl and/or else a tert-alkyl group. Particularly preferred compounds of the general formula V and also aminosilanes derived therefrom and specifically bonded chemically on a support material are selected from the group: $z=1$, $d=3$ and $g=1$; $z=2$, $d=3$, $g=1$; $z=1$, $d=3$, $g=2$; $z=2$, $d=3$, $g=2$; $z=1$, $d=3$ und $g=8$; $z=2$, $d=3$, $g=8$; $z=1$, $d=3$, $g=4$; $z=2$, $d=3$, $g=4$; $z=1$, $d=3$, $g=8$; $z=2$, $d=3$, $g=8$.

Further preferred catalysts for preparing monomeric and/or dimeric silicon compounds/silanes as well as for the use according to the invention may be amines, ammonium salts, aminosilanes, -siloxanes and also supported aminosilanes, -siloxanes. And also amines of formula VII where the anion Z is for example a halide, such as fluoride, chloride, bromide, iodide; or a nitrate, phosphate, sulphate, acetate, formate or propionate. These catalysts further include N-methyl-2-pyrrolidone, methylimidazoles, tetramethylurea, tetramethylguanidine, trimethylsilylimidazole, benzothiazole, N,N-dimethylacetamide. Mixtures of the catalysts mentioned may further be used. Useful catalysts may further include ion exchangers, for example in the form of catalysts based on divinylbenzene-crosslinked polystyrene resin having tertiary amine groups, which is obtained by direct aminomethylation of a styrene-divinylbenzene copolymer (DE 100 57 521 A1), on solids bearing amino or alkyleneamino groups, for example dimethylamino groups, on a scaffold of polystyrene crosslinked with divinylbenzene (DE 100 61 680 A1, DE 100 17 168 A1), on anion-exchanging resins having tertiary amino groups or quaternary ammonium groups (DE 33 11 650 A1), amine-functionalized inorganic supports (DE 37 11 444 A1) or according to DE 39 25 357 organopolysiloxane catalysts, such as N[(CH$_2$)$_3$ SiO$_{3/2}$]$_3$. It is further also preferable to use silanes, siloxanes and supported silanes, siloxanes as described in DE 37 11 444 specifically as described in DE 102007059170.7. The aforementioned patent documents are hereby fully incorporated herein by reference for their content concerning catalysts.

The process may particularly preferably also be performed using amino-functionalized, aromatic polymers having alkyl-functionalized secondary, tertiary and/or quaternary amino groups as a catalyst. The alkyl groups may be linear, branched or cyclic, preference being given to methyl or ethyl. The invention can be carried out using amino-functionalized divinylbenzene-styrene copolymers, i.e. divinylbenzene-crosslinked polystyrene resins, in which case those from the group of dialkylaminomethyl-functionalized divinylbenzene-styrene copolymers or trialkylaminomethyl-functionalized divinylbenzene-styrene copolymers are particularly preferred, specifically with alkyl being methyl or ethyl, preference being given to dimethylamino- or trimethylaminomethyl-functionalized copolymers. In addition to dimethylamino-functionalized divinylbenzene-crosslinked porous polystyrene resins, divinylbenzene-crosslinked porous polystyrene resins functionalized with quaternary and also optionally tertiary amino groups can further be used for treating the inorganic silanes.

A particularly suitable way to perform the process according to the invention is to use divinylbenzene-crosslinked polystyrene resins having tertiary amino groups as a pre-catalyst, such as Amberlyst® A 21—an ion exchange resin based on divinylbenzene-crosslinked polystyrene resin having dimethylaminomethylene groups on the polymeric backbone of the resin. Amberlyst® A21 is a weak basic anion exchange resin which is available as a free base and in spherules having an average diameter of about 0.49 to 0.69 mm and a water content of up to 54% to 60% by weight based on the total weight. The surface area amounts to about 25 m$^2$/g and the median pore diameter is 400 angströms. For use as a catalyst, the pre-catalyst has to be cautiously treated with care under vacuum at temperatures which are not too high, preferably below 175° C., better below 130° C. or at low temperature, to be usable as an essentially anhydrous catalyst. In a further preferred alternative, the support material comprises shaped articles comprising silicon oxide. Shaped articles comprising silicon oxide are specifically granules, pellets, ball-shaped SiO$_2$ articles, Raschig rings, sieve plates or else extrudates or strand-cast articles of any desired shape. It is particularly preferable for the support material to consist of shaped SiO$_2$ articles and more preferably of ball-shaped SiO$_2$ articles. Preferred support materials further include inorganic materials, organic materials, such as polymers, or composite materials.

The invention likewise provides for the use of hydrogen halide and of a nitrogen-containing catalyst for splitting oligomeric inorganic silanes which have three or more covalently directly interconnected silicon atoms, specifically a silane with Si—Si—Si fragment and the substituents on the silicon atoms are selected from halogen, hydrogen and/or oxygen, to form specifically monomeric and/or dimeric silicon compounds which preferably conform to the general formula I. The oligomeric silanes may possibly also comprise, to a minor extent, hydrolysis products thereof and then be subjected to the splitting reaction. Therefore, the monomeric silanes may also have hydroxyl groups.

The invention will now be more particularly elucidated with reference to the exemplary embodiments depicted in the figures, where:

FIG. 1 depicts a plant for preparing monomeric and dimeric silicon compounds.

EXAMPLES

Example 1

Splitting of Octachlorotrisilane

Procedure: 135 g of NaCl for HCl production were initially charged to a 1 l three-neck flask equipped with dropping funnel and gas outlet (reaction vessel 1) and 270 ml of concentrated H$_2$SO$_4$ were introduced into the dropping funnel. A 2 l three-neck flask equipped with stirrer, gas inlet tube and reflux condenser (reaction vessel 3) was initially charged with sodium methoxide solution (30% strength) and mixed with indicator (phenolphthaline). This flask was ice cooled during the entire reaction. A 250 ml four-neck flask equipped with gas inlet tube, thermometer, gas outlet and column head with distillate receiver was initially charged with 24 g of the catalyst balls described hereinbelow and 72.5 g of the octachlorotrisilane-containing mixture (composition see GC table) were added.

As depicted in FIG. 1, the reaction flask (2) was heated to 90° C. by means of the oil bath and the sulphuric acid was dripped onto the sodium chloride. The drip rate was adjusted such that a constant HCl flow of about 3 l/h resulted throughout the entire run. The gaseous hydrogen chloride was passed via a gas inlet tube into the lower part of the flask, through the catalyst balls and can be prepared in accordance with the method of synthesis prescribed hereinbelow. The gas stream was passed through the reflux condenser into the cooled sodium methoxide solution for neutralization. After 20 min reaction time, reflux ensued in the reaction flask and liquid was collected in the distillation receiver. After 2 h reaction time the run was discontinued. The receiver had collected 6.8 g of distillate. GC analyses (Table 1) of the distillate in the receiver, of the liquid remaining as bottom product in the reaction flask and of the starting material were carried out.

TABLE 1

GC analysis

| GC sample | HSiCl$_3$ (TCD %) | SiCl$_4$ (TCD %) | Si$_2$Cl$_6$ (TCD %) | Si$_3$Cl$_8$ (TCD %) | Si$_4$Cl$_{10}$ (TCD %) |
|---|---|---|---|---|---|
| starting sample | — | — | 4.5 | 86.5 | 6.4 |
| bottoms | 10.9 | 24.8 | 63.4 | — | — |
| distillate | 35.1 | 64.9 | — | — | — |

Octachlorotrisilane can be split into trichlorosilane and silicon tetrachloride with HCl in the presence of a suitable catalyst. The reaction proceeds via hexachlorodisilane as a stable intermediate.

Example 2

Splitting of Decachlorotetrasilane

Procedure: 210 g of NaCl for HCl production were initially charged to a 1 l three-neck flask equipped with dropping funnel and gas outlet (reaction vessel 1) and 420 ml of concentrated H$_2$SO$_4$ were introduced into the dropping funnel. A 2 l three-neck flask equipped with stirrer, gas inlet tube and reflux condenser (reaction vessel 3) was initially charged with sodium methoxide solution (30% strength) and mixed with indicator (phenolphthalein). This flask was ice cooled during the entire reaction. A 250 ml four-neck flask equipped with gas inlet tube, thermometer, septum, gas outlet and column head with distillate receiver was initially charged with 24 g of the below-described catalyst balls, prepared as per the method of synthesis prescribed herein below, and 96.6 g of the decachlorotetrasilane-containing mixture (composition see GC table) were added. The reaction flask (2) in FIG. 1 was heated by means of the oil bath initially to 85° C. and after 1 h to 95° C. and the sulphuric acid was dripped onto the sodium chloride. The drip rate was adjusted such that a constant HCl flow of about 2.5 l/h resulted throughout the entire run. The gaseous hydrogen chloride was passed via a gas inlet tube into the lower part of the flask, through the catalyst balls. The gas stream was passed through the reflux condenser into the cooled sodium methoxide solution for neutralization. After 2 h reaction time, very slow reflux ensued in the reaction flask. After about 3 h liquid slowly distilled over and was collected in the distillation receiver. After 4 h reaction time the run was discontinued. The receiver had collected 6.0 g of distillate. After 1, 2 and 4 h reaction time samples of the respective bottom product were removed from the reaction flask by the septum (bottoms 1-3). GC analyses (Table 2) of the distillate in the receiver, of the samples from the reaction flask and of the starting material were carried out.

TABLE 2

| GC analysis | | | | | | |
|---|---|---|---|---|---|---|
| GC sample | $HSiCl_3$ (TCD %) | $SiCl_4$ (TCD %) | $Si_2Cl_6$ (TCD %) | $Si_3Cl_8$ (TCD %) | $Si_4Cl_{10}$ (TCD %) | Higher oligomers |
| starting sample | — | — | 0.5 | 3.2 | 81.7 | 12.2 |
| bottoms 1* | 2.7 | 3.5 | 14.8 | 12.0 | 53.8 | 8.5 |
| bottoms 2* | 2.3 | 4.6 | 33.0 | 16.7 | 30.4 | 7.4 |
| bottoms 3* | 4.5 | 9.5 | 46.5 | 9.4 | 15.9 | 5.6 |
| distillate** | 22.9 | 62.5 | 14.1 | — | — | — |

*The bottom-product samples 1-3 had, between the main signals, trace signals due to partially hydrogenated chlorosilane oligomer species which are likewise formed during the degradation reaction. This explains the deviations from 100%.
**Some hexachlorodisilane was collected in the receiver despite a distinctly higher boiling temperature owing to the long, continuous stripping with HCl.

Decachlorotetratrisilane can be split into trichlorosilane and silicon tetrachloride with HCl in the presence of a suitable catalyst. The reaction proceeds via octachlorotrisilane and hexachlorodisilane as the most stable intermediate.

Preparation of Supported Catalyst:

600 g of aqueous ethanol ($H_2O$ content=5%) and 54 g of 3-diisobutylaminopropyl-trimethoxysilane were initially charged together with 300 g of catalyst support ($SiO_2$ balls, Ø about 5 mm). The reaction mixture was heated at an oil bath temperature of 123 to 128° C. for 5 hours. After cooling, the supernatant liquid was sucked off and the balls were washed with 600 g of anhydrous ethanol. After one hour, the liquid was sucked off again. The balls were predried at a pressure of 305 to 35 mbar and a bath temperature of 110 to 119° C. for one hour and then dried at <1 mbar for 9.5 hours.

LIST OF REFERENCE SYMBOLS

1 Reaction vessel
2 Reaction flask
3 Receiving flask, HCl introduction
4 Dropping funnel
5 HCl flow meter (Rotameter)
6 Condenser
7 Distillation receiver
8 Condenser

The invention claimed is:
1. A process comprising:
reacting an oligomeric silane or a mixture comprising an organic silane in the presence of hydrogen halide over a catalyst, thereby obtaining a silicon compound of formula I:

$$Si_nH_xX_y \quad (I),$$

wherein each X is independently a halogen,
n is 1 or 2,
x is an integer between 0 to 6,
y is an integer between 0 to 6,
y+x=2n+2,
the oligomeric silane or mixture comprising an organic silane comprises three directly covalently connected silicon atoms, and
substituents on said organic silane comprising three directly covalently connected silicon atoms are each halogen, hydrogen, or oxygen;
wherein the catalyst consists of an amino-functionalized compound or a monomeric or oligomeric aminosilane derived therefrom chemically bonded to a support material, a hydrocarbon-substituted amine, or a divinylbenzene-crosslinked polystyrene resin comprising tertiary amine groups,
the amino-functionalized compound, if present, comprises alkyl-functionalized secondary, tertiary, or quaternary amino groups, or a combination thereof,
the amino-functionalized compound, if present, is a compound of formula V or a hydrolysis product thereof, condensation product thereof, or both:

$$(C_zH_{2z+1}O)_3Si(CH_2)_dN(C_gH_{2g+1})_2 \quad (V)$$
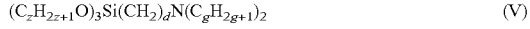

z is an integer from 1 to 4,
g is an integer from 1 to 10,
d is an integer from 1 to 3,
the hydrocarbon-substituted amine if present is of formula VI or VII:

$$NH_kR_{3-k} \quad (VI)$$

$$[NH_lR^1_{4-l}]^+Z^- \quad (VII),$$

k=0, 1, or 2,
each R is independently an aliphatic linear or branched or cycloaliphatic or aromatic hydrocarbon having 1 to 20 carbon atoms
l=0, 1, 2, or 3,
each $R^1$ is independently an aliphatic linear or branched or cycloaliphatic or aromatic hydrocarbon having 1 to 18 carbon atoms, and
Z is an anion
wherein the oligomeric silane or the mixture comprises a trisilicon compound, tetrasilicon compound, pentasilicon compound, hexasilicon compound, polysilicon compound, or any combination thereof.
2. The process according to claim 1, wherein the oligomeric silane or the mixture comprises a perhalosilane, a hydrogen silane, or any mixture thereof.
3. The process according to claim 1, wherein the hydrogen halide is hydrogen chloride.
4. The process according to claim 1, wherein each X is chlorine.

5. The process according to claim 1, wherein the silicon compound of formula I comprises hexachlorodisilane, pentachlorodisilane, hexahydrodisilane, tetrachlorosilane, trichlorosilane, monosilane, monochlorosilane, dichlorosilane, or a mixture thereof.

6. The process according to claim 1, wherein the silicon compound of formula I is hexachlorodisilane or a mixture of hexachlorodisilane with one or both of tetrachlorosilane or trichlorosilane, optionally further with dichlorosilane.

7. The process according to claim 1, wherein the catalyst is chemically fixed to a support.

8. The process according to claim 1, wherein the catalyst is an aminoalkoxysilane of formula V and is chemically bonded to a silicatic support.

9. The process according to claim 1, wherein the oligomeric silane comprises octachlorotrisilane, decachlorotetrasilane, dodecachloropentasilane, tetradecahexasilane, decachlorocyclopentasilane, or any mixture thereof.

10. The process according to claim 1, wherein the catalyst is diisobutylaminopropyltrimethoxysilane, on a silicatic support material.

11. The process according to claim 1, wherein the reacting comprises:
splitting the oligomeric inorganic silane or the mixture, and
distillatively removing the compound of formula I during the splitting.

12. A process comprising:
reacting an oligomeric silane or a mixture comprising an organic silane in the presence of hydrogen halide over a catalyst, thereby obtaining a silicon compound of formula I:

$$Si_nH_xX_y \quad (I),$$

wherein each X is independently a halogen,
n is 1 or 2,
x is an integer between 0 to 6,
y is an integer between 0 to 6,
y+x=2n+2,
the oligomeric silane or mixture comprising an organic silane comprises three directly covalently connected silicon atoms, and
substituents on said organic silane comprising three directly covalently connected silicon atoms are each halogen, hydrogen, or oxygen;
wherein the catalyst consists of an amino-functionalized compound or a monomeric or oligomeric aminosilane derived therefrom chemically bonded to a support material, a hydrocarbon-substituted amine, or a divinylbenzene-crosslinked polystyrene resin comprising tertiary amine groups,
the amino-functionalized compound, if present, comprises alkyl-functionalized secondary, tertiary, or quaternary amino groups, or a combination thereof,
the amino-functionalized compound, if present, is a compound of formula V or a hydrolysis product thereof, condensation product thereof, or both:

$$(C_2H_{2z+1}O)_3Si(CH_2)_dN(C_gH_{2g+1})_2 \quad (V)$$

z is an integer from 1 to 4,
g is an integer from 1 to 10,
d is an integer from 1 to 3,
the hydrocarbon-substituted amine if present is of formula VI or VII:

$$NH_kR_{3-k} \quad (VI)$$

$$[NH_lR^1_{4-l}]^+Z^- \quad (VII),$$

k=0, 1, or 2,
each R is independently an aliphatic linear or branched or cycloaliphatic or aromatic hydrocarbon having 1 to 20 carbon atoms
l=0, 1, 2, or 3,
each $R^1$ is independently an aliphatic linear or branched or cycloaliphatic or aromatic hydrocarbon having 1 to 18 carbon atoms, and
Z is an anion,
wherein the oligomeric silane or mixture comprises a silane of any of formulae (II), (III), or (IV) or a hydrolysate thereof:

$$Si_mH_aX_b \quad (II),$$

$$Si_oH_pX_q \quad (III),$$

$$Si_rH_sX_t \quad (IV),$$

m is an integer not less than 3,
a is an integer of 0 or not less than 1,
b is an integer of 0 or not less than 1, with the proviso that a+b=2m+2,
o is an integer of not less than 3,
p is an integer of 0 or not less than 1,
q is an integer of 0 or not less than 1, with the proviso that p+q=2o,
r is an integer of not less than 3,
s is an integer of 0 or not less than 1,
t is an integer of 0 or not less than 1, with the proviso that s+t=r, and
each X is independently halogen.

13. The process according to claim 12, wherein the oligomeric silane or the mixture comprises a perhalosilane, a hydrogen silane, or any mixture thereof.

14. The process according to claim 12, wherein the hydrogen halide is hydrogen chloride.

15. The process according to claim 12, wherein each X is chlorine.

16. The process according to claim 12, wherein the silicon compound of formula I comprises hexachlorodisilane, pentachlorodisilane, hexahydrodisilane, tetrachlorosilane, trichlorosilane, monosilane, monochlorosilane, dichlorosilane, or a mixture thereof.

17. The process according to claim 12, wherein the silicon compound of formula I is hexachlorodisilane or a mixture of hexachlorodisilane with one or both of tetrachlorosilane or trichlorosilane, optionally further with dichlorosilane.

18. The process according to claim 12, wherein the catalyst is chemically fixed to a support.

19. The process according to claim 12, wherein the catalyst is an aminoalkoxysilane of formula V and is chemically bonded to a silicatic support.

20. The process according to claim 12, wherein the oligomeric silane comprises octachlorotrisilane, decachlorotetrasilane, dodecachloropentasilane, tetradecahexasilane, decachlorocyclopentasilane, or any mixture thereof.

21. The process according to claim 12, wherein the catalyst is diisobutylaminopropyltrimethoxysilane, on a silicatic support material.

22. The process according to claim 12, wherein the reacting comprises:
splitting the oligomeric inorganic silane or the mixture, and
distillatively removing the compound of formula I during the splitting.

* * * * *